United States Patent [19]

Bowker et al.

[11] Patent Number: 5,195,132
[45] Date of Patent: Mar. 16, 1993

[54] TELEPHONE NETWORK SPEECH SIGNAL ENHANCEMENT

[75] Inventors: Duane O. Bowker, Neptune City; John T. Ganley, Milford; J. H. James, Farmingdale, all of N.J.

[73] Assignee: AT&T Bell Laboratories, Murray Hill, N.J.

[21] Appl. No.: 620,997

[22] Filed: Dec. 3, 1990

[51] Int. Cl.$^5$ ............................................. H04M 1/76
[52] U.S. Cl. .................................... 379/410; 379/406; 379/400
[58] Field of Search ............... 379/414, 400, 401, 410, 379/406, 409

[56] References Cited

U.S. PATENT DOCUMENTS

| | | | |
|---|---|---|---|
| 3,781,481 | 12/1973 | Shaffer et al. | 379/400 X |
| 3,784,756 | 1/1974 | Nemchik | 379/400 |
| 3,818,151 | 6/1974 | Chambers, Jr. et al. | 379/414 X |
| 3,911,370 | 10/1975 | Pace | 330/21 |
| 4,054,941 | 10/1977 | Shichman | 379/400 |
| 4,056,688 | 11/1977 | Stiefel | 379/400 X |
| 4,132,863 | 1/1979 | Smith | 379/400 |
| 4,277,655 | 7/1981 | Surprenant | 379/400 X |
| 4,315,107 | 2/1982 | Ciesielka et al. | 379/400 |
| 4,490,843 | 12/1984 | Bose et al. | 381/102 |
| 4,535,445 | 8/1985 | Lane et al. | 370/62 |
| 4,809,338 | 2/1989 | House | 381/103 |

FOREIGN PATENT DOCUMENTS 0260933 10/1989 Japan ................................. 379/414

OTHER PUBLICATIONS

Hobby Electronics, Mar. 1982, vol. 4, No. 3, "Stereo Bass Booster", pp. 52-54, Author unknown.

Primary Examiner—James L. Dwyer
Assistant Examiner—Magdy W. Shehata
Attorney, Agent, or Firm—F. B. Luludis

[57] ABSTRACT

The quality of voice signals transmitted by a telephone station set, or similar device, are enhanced in accordance with the steps of the instant method before such signals are delivered to a receiving telephone station set by restoring the level of speech energy attenuated by the transmitting set, in which such restoration is performed at a point along a telephone connection between the transmitting and receiving telephone stations, for example, at a point within a telecommunications system which establishes the connection.

24 Claims, 3 Drawing Sheets

TELEPHONE NETWORK SPEECH SIGNAL ENHANCEMENT

FIELD OF THE INVENTION

The invention relates to a method of processing speech signals transmitted by a telephone station set, and more particularly relates to a method of enhancing the quality of such signals before they are supplied to a receiving telephone station set.

BACKGROUND OF THE INVENTION

It is well-known in the art of high-fidelity and stereo recordings that the overall quality of the reproduction of sound signals obtained from a source such as, magnetic tape, a record, etc., may be enhanced in certain situations (e.g., low listening levels) by raising the level of those signals having frequencies within the so-called bass region. However, the designers of telecommunications systems have heretofore taken an opposite approach and have purposely discriminated against speech signals residing in the bass region, thereby degrading the overall quality of speech signals that are delivered to an intended destination, e.g., a telephone station set.

The reason for such discrimination is that surveys show that the predominant sources of ambient (background) noise have most of their energy in the low frequency range. Accordingly, to prevent a telephone station set that is in use from "picking up" such noise, the station set transmitter is designed so that it noticeably attenuates signals below 300 Hz. In fact, the Electronic Industries Association (EIA) standard RS-470, published January, 1981, and relating to the design of telephone instruments recommends such attenuation below 300 Hz. What this means is that the quality of voice signals that are received at a telephone station set is noticeably diminished as a result of severely attenuating the level of such signals below 300 Hz at the transmitting telephone station set.

SUMMARY OF THE INVENTION

The quality of voice signals as perceived by a telephone listener is greatly enhanced, in accordance with the inventive method, by disposing in a telecommunications network, external to telephone station sets or similar devices, a method of restoring the level of speech energy attenuated by a transmitting telephone station set. In particular, the inventive method is directed to arranging a telecommunications network so that it selectively amplifies by a predetermined level a telephone speaker's voice signals that are within a predetermined frequency range, e.g., 100–300 Hz, relative to the remainder of the telephone passband, before supplying such signals to a receiving telephone station set.

DETAILED DESCRIPTION

Figure 1:
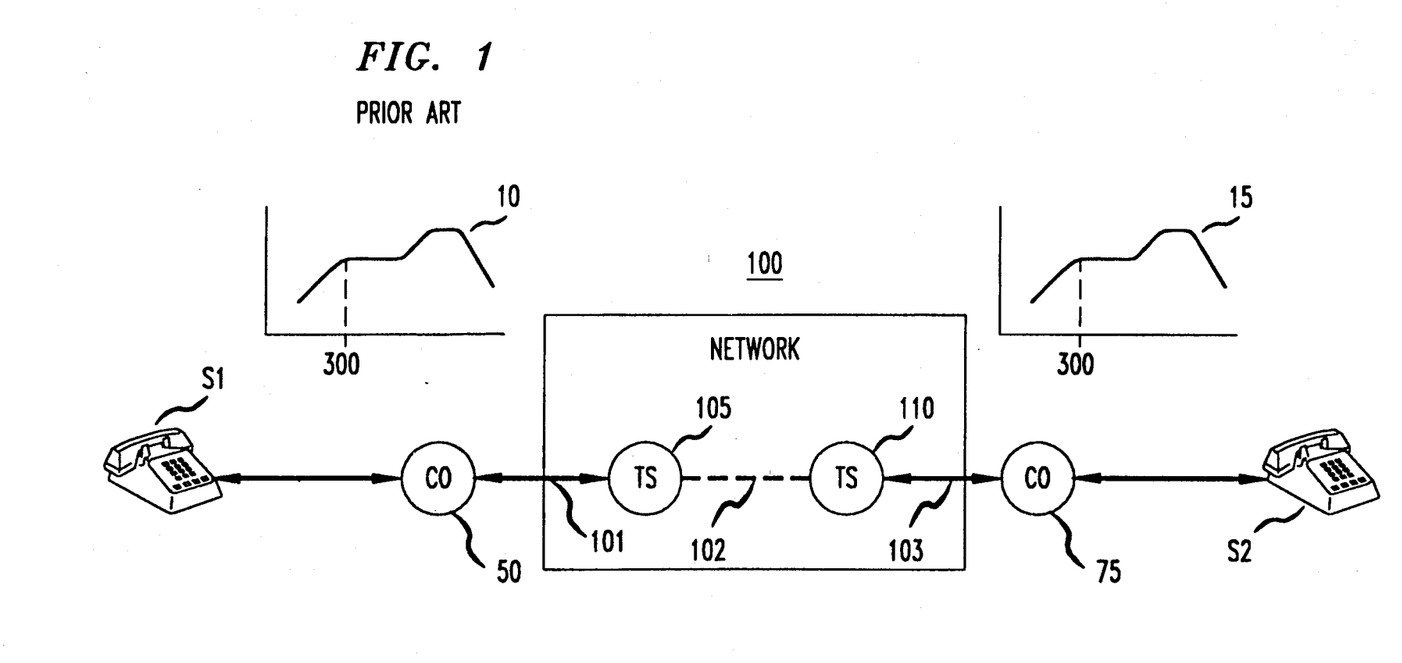
FIG. 1 is a broad block diagram of a telecommunications system illustrating the effect of attenuating speech signals within the bass band.

Turning now to FIG. 1, there is shown a simplified block diagram of a telecommunications network 100, which may be, for example, the AT&T network. As is well-known, the AT&T network comprises, inter alia, a plurality of toll offices, such as toll offices 105 and 110, that may be interconnected to one another to provide long distance voice and data connections for its subscribers, such as the telephone user, associated with station sets S1 and S2. The manner in which a telephone user, e.g., the user associated with station S1, establishes via network 100 a telephone connection to another such user, e.g., the user associated with station S2, is well-known and will not be described herein. However, it suffices to say that a telephone user (hereinafter also "subscriber") may establish such a connection by causing station S1 to go "off hook" and then dialing the telephone number associated with station S2. Local central office 50 associated with station S1 collects the telephone digits as they are dialed and establishes a connection 101 to a network 100 toll office, e.g., toll office 105 (also referred to herein as a toll switch). Toll office, or switch, 105, in turn, and based on the dialed telephone number that it receives from local central office 50, establishes a connection 102 to a so-called destination toll switch, such as toll switch 110. Destination toll switch 110, in turn, extends the connection to central office 75 associated with station S2 and passes to that office the dialed telephone number. The latter central office responsive to receipt of the dialed digits then extends the connection 103 to station S2. The subscribers positioned respectively at stations S1 and S2 may then begin to speak to one another via the established connection.

However, as a result of the aforementioned signal attenuation that is introduced by a telephone station set, e.g., station S1, the quality of the voice signals that the station transmits will be greatly diminished and, therefore, will not represent the speaker's true voice signals. This aspect is graphically illustrated in FIG. 1, in which curve 10 depicts the frequency response characteristic of the filter applied to the speech signals that station S1 supplies to toll switch 105 via line 101.

It can be seen from curve 10 that, as a result of the station S1 filter, the speaker's voice signals "rolls off" sharply below 300 Hz, at a rate of approximately 12 dB per octave in accord with the aforementioned EIA RS-470 standard. Accordingly, a significant amount of the speech energy within the bass range is attenuated at a transmitting station set, e.g., S1, and, therefore, is not supplied to network 100 for delivery to a receiving station set, e.g., S2, as illustrated by filter response curve 15.

After carefully reviewing curves 10 and 15 and the speech processing limitation of telephone switching equipment, we have recognized that, in accordance with the invention, the quality of telephone speech signals could be readily enhanced to offset the effect of transmitter attenuation, and that such enhancement may be performed at some point along the connection between the transmitting and receiving telephone station sets. In this way, the resulting signals that are supplied to the receiving station set would be more representative of the speaker's voice than the signals outputted by the transmitting station set. It is to be understood of course that such enhancement would also increase the level of the aforementioned ambient noise. However, studies show that most telephone users prefer to listen to enhanced speech, with an attendant increase in the level of background noise, rather than speech which has not been so enhanced.

Moreover, we have recognized that, in accordance with an aspect of the invention, such signal enhancement could be readily performed at a central location which is involved in establishing a telephone connection between two telephone station sets, and which may be readily adapted to enhance the quality of speech signals. Such a central location may be, for example, network 100, as shown in FIG. 2.

Figure 2:
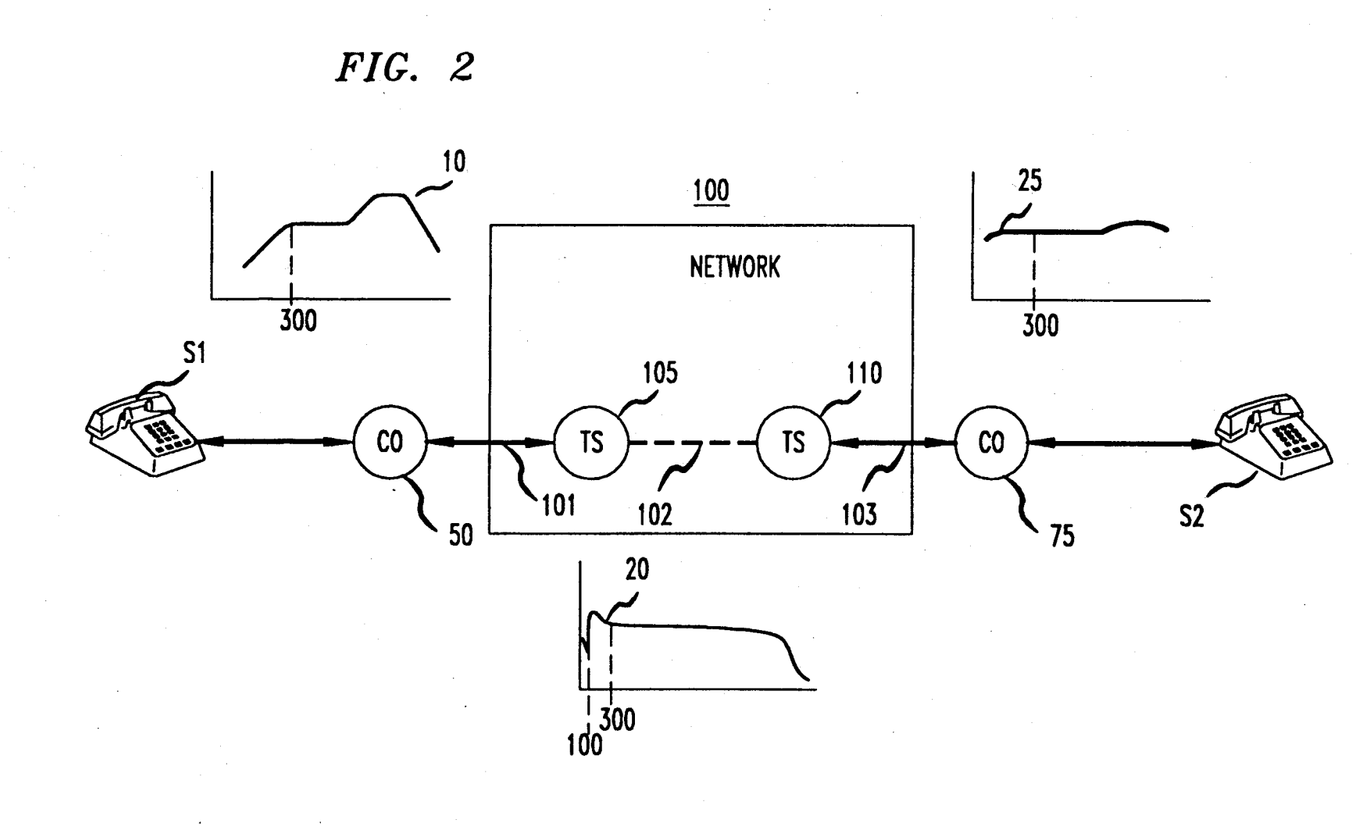
FIG. 2 is a broad block diagram of the telecommunications system of FIG. 1 and illustrates the effect of enhancing speech signals before such signals are supplied to a receiving telephone station set.

(It can be appreciated that FIG. 2 is similar in certain respects to FIG. 1. Consequently, elements in FIG. 2 which are identical to those shown in FIG. 1 are similarly numbered.)

Referring then to FIG. 2, network 100 is now arranged in accord with frequency response curve 20 to compensate the level of speech signals that it receives from a transmitting telephone station set. In particular, the frequency response of curve 20 is particularly designed to increase, or boost, the level of speech signals below a predetermined frequency—illustratively 300 Hz. Such compensation may be achieved by passing speech signals received from a transmitting telephone station set through particular circuitry, such as, for example, a digital filter, in which the coefficients of the digital filter are selected in a conventional manner to increase the level of speech signals occurring within a particular range of frequencies,—illustratively a frequency range of 100-300 Hz. In an illustrative embodiment of the invention, the digital filter may be arranged to increase the gain of speech signals occurring within the aforementioned range by, for example, 10-15 decibels (dB) relative to the gain provided at, for example, 1000 Hz. This gain treatment is illustrated by response curve 20, in which the gain within the range of frequencies of 100 Hz to 300 Hz (or 100 Hz to 400 Hz) is greater than that of the remainder of curve 20, which is relatively flat.

Thus, the application of such compensation to speech signals received by network 100 results in restoring the speech energy that was lost at the transmitter of the transmitting telephone station set, as illustrated by frequency response curve 25, which, as a result of being virtually flat, yields a more representative speech spectrum to the subscriber at station S2 than response curve 15 (FIG. 1). Accordingly, as a result of such compensation, network 100, for the first time, delivers to the receiving telephone station set speech signals that more truly represent the speaker's voice.

In an illustrative embodiment of the invention, the aforementioned digital filter was implemented using a commercially available digital filter, such as, for example, the DEQ7 digital equalizer available from the YAMAHA Corporation. The DEQ7 digital equalizer is programmable, allowing a user thereof to customize the equalization of a signal to meet a desired objective. That is, the user may set the gain of any one of a plurality of frequency bands between 63 Hz and 16 Hz to a desired value between −18.0 db and +18.0 db, in which a preset, or default value is set at 0 db. In our illustrative implementation, the gain of the frequency bands covering 125 Hz through 360 Hz were programmed to approximately meet the aforementioned gain of 10-15 dB, and the gain of the remaining bands were programmed to meet the preset value. The programming of the DEQ7 therefore effectively covered the desired frequency range below 300 Hz.

As mentioned above, such compensation may be disposed at any point along a telephone connection between two telephone sets. We have recognized, however, that selecting the optimum point for the location of such compensation within a telecommunications network is not a trivial task, and is indeed nonobvious. The reason for this is that a telephone connection involves the cooperation between complex switching equipment. For example, a large network such as the AT&T network, employs a large number of complex switching offices interconnected by thousands of miles of transmission links and many different types of transmission equipment such as echo cancelers, multiplexers, synchronization systems, etc., to establish a telephone connection between virtually any two telephone stations in the U.S. In addition, a large network using such resources provides a number of different telecommunications services, and a variety of access arrangements to deliver such services to its subscribers. Thus, the optimum location for such compensation within a telecommunications network needs to be one which does not degrade the delivery of such services.

In view of the foregoing, and after carefully studying the various switching aspects and services provided by a large network, we have recognized that one such an optimum location could be, in accord with an aspect of the invention, a transmission element centrally disposed in network 100. One such transmission element is an echo canceler.

As is well-known, transmission media may include, inter alia, digital circuitry for processing voice signals. Such circuitry typically includes a digital device adapted to effectively remove from digitized speech signals so-called echo signals. Such a device is commonly referred to as an echo canceler. We have recognized that an echo canceler, in accord with an aspect of the invention, represents one of a number of ideal locations within network 100 at which the inventive method may be employed to enhance the quality of speech signals.

Figure 3:
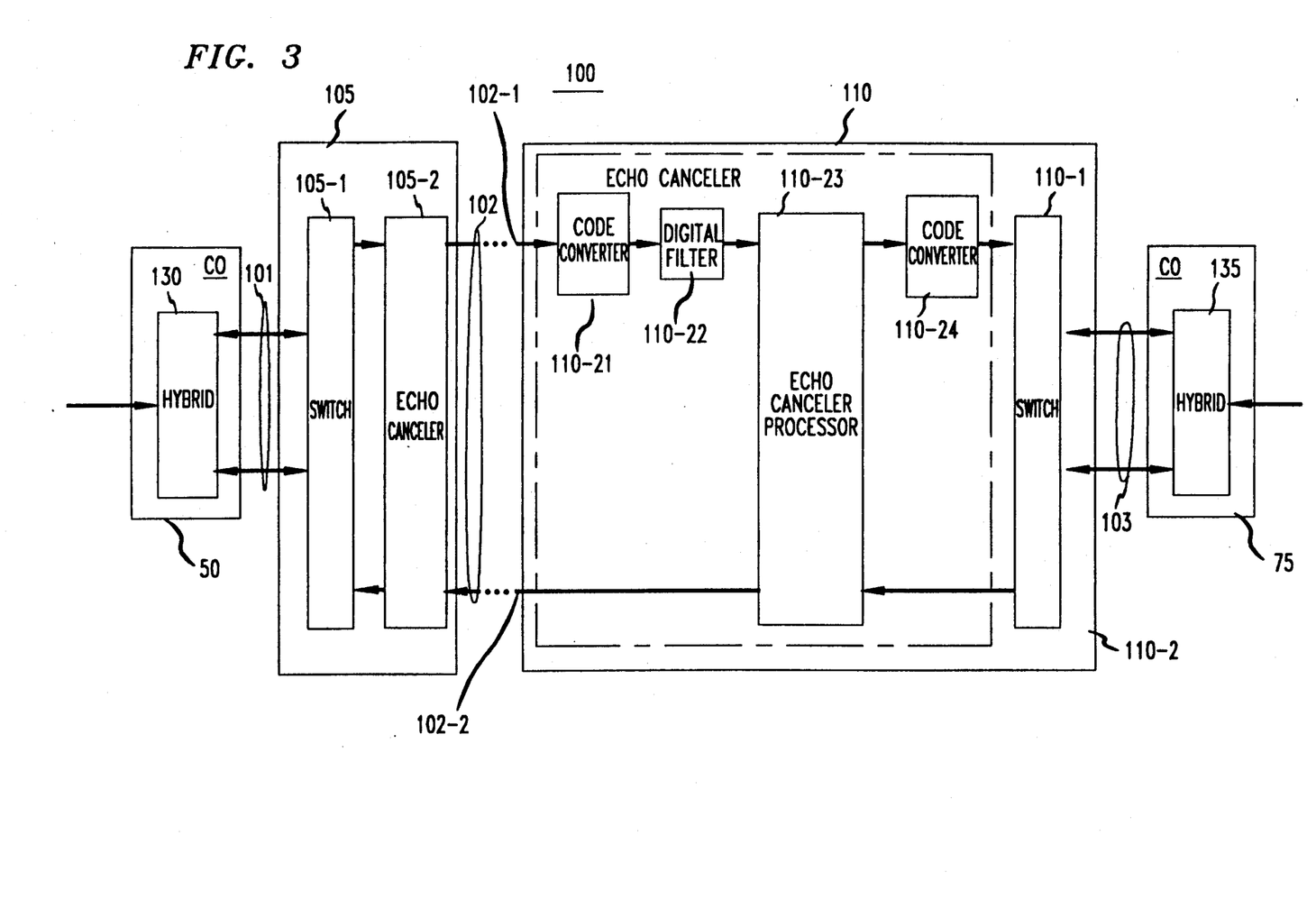
FIG. 3 is an illustrative block diagram of the telecommunications network of FIG. 1 in which the invention may be practiced.

Turning then to FIG. 3, there is shown in more detail toll switching offices 105 and 110 of network 100, in which each such office includes, inter alia, a switching element, e.g., switches 105-1 and 110-1, which may be, for example, the well-known 4ESS switch available from AT&T. Offices 105 and 110 also include echo canceling circuitry, which is used to interface a switch output port, or digroup terminal (not shown) with transmission media, such as communications path 102. Communications path 102 is shown in the Fig. as two oppositely directed transmission paths 102-1 and 102-1. For the sake of brevity and clarity, only one echo canceler circuit is shown in the FIG. for each of the toll offices 105 and 110, namely circuits 105-2 and 110-2. Since echo cancelers 105-2 and 110-2 perform essentially the same functions, a discussion of one such circuit pertains equally well to the other.

Specifically, as is well-known, an echo canceler performs a number of signal processing functions. One such function is the cancellation of an echo signal that may be present in speech signals. An echo signal is a reflection of a transmitted signal and typically occurs as result of an impedance mismatch between the transmission medium, e.g., telephone line, and a two-wire-to-fourwire hybrid, such as either hybrid 130 or 135. (It is noted that a hybrid is typically associated with a CO, such as COs 50 and 75 and may be disposed at either the line side or trunk side of a CO. In certain instances, a hybrid may be associated with a toll switch.) Accordingly, echo canceler 110-2 and associated circuitry operates in a well-known manner to compare transmitted speech signals received via path 102-1 with signals propagating in an opposite direction via path 102-2, and cancels the latter signals if they are found to be echoes of previously transmitted speech signals. The echo canceler contained in office 105 performs a similar function by comparing transmitted speech signals received via path 102-2 with signals traveling in an opposite direction via path 102-1.

The echo canceler circuitry also includes code converters 110-21 and 110-24. Converter 110-21 operates to convert speech signals encoded in the well-known mu-255 law format (or in certain instances a so-called A-law format) into a linear format for presentation to echo canceler processor 110-23 via digital filter 110-22. Code converter 110-24 performs an opposite function. That is, converter 110-24 converts linear encoded speech signals that it receives from canceler 10-24 into the mu-255 law format (or A-law format) before such signals are supplied to switch 110-1 for ultimate delivery to a receiving telephone station set (e.g., station set S2 shown in FIGS. 1 and 2).

Digital filter 110-22 implements the inventive method in echo canceler 110-2. A similar circuit implements the invention in echo canceler 105-2. The way in which a digital filter is implemented is well-known and will not be discussed herein. However, it suffices to say digital filter 110-22, as well as the digital filter contained within the echo canceler of trunk 105-2, multiplies the response of speech signals that it receives with the response of curve 20 shown in FIG. 2, in which the response of curve 20 is characterized by the digital filter coefficients. In this way, those speech signals having frequencies below, for example, 300 Hz, are multiplied by the response of the filter which raises the energy level of those signals by a predetermined value—illustratively 10 to 15 decibels. Speech signals having frequencies above, for example, 300 Hz, are multiplied by the remainder of the filter response which raises the level of those signals by another predetermined value—illustratively 0 decibels.

Advantageously, then, network 100 is arranged in accord with the inventive method to enhance the quality of speech signals received via one telephone line, e.g., line 101, before those signals are delivered to another telephone line, e.g., line 103, and vice-versa.

The foregoing is merely illustrative of the principles of the invention. Those skilled in the art will be able to devise numerous arrangements, which, although not explicitly shown or described herein, embody those principles and are within its spirit and scope. In particular, it is recognized of course that the desired result may still be achieved even though the inventive enhancement method may be disposed at some other point along the aforementioned connection, as will be discussed below. For example, the inventive compensation method may be readily disposed within a central office. In particular, a digital circuit implementing the steps of the invention may be disposed in either a central office incoming or outgoing trunk. In this way, speech signals associated with either an intraoffice or interoffice call may enjoy such compensation. As another example, if the station sets are associated with a business communication system, such as a private branch exchange, then the inventive compensation method may be employed in the business communication system to improve the quality of speech signals that are processed solely by that system. As a further example, the steps of the inventive method may be employed in a telephone station set. However, in view of the fact that millions of such sets are currently in use in the United States, the cost of implementing the invention in such station sets would be exceedingly high. Advantageously, then, all such station sets may still enjoy the results provided by the compensation method by performing such compensation at a central location, namely, network 100, as discussed above. As a further example, the invention may be employed in a so-called enhanced telecommunication service, such as a voice mail service, or a voice announcement service.

We claim:

1. A method of enhancing the quality of speech signals exchanged between first and second telephone station sets, said method comprising the steps of
    responding to receipt of a request originated by either one of said first or second telephone station sets, wherein at least one of said first and second telephone station sets is arranged to attenuate by a predetermined attenuation rate those of said speech signals having frequencies below a predetermined frequency and to transmit said speech signals over said communications path, and
    responding to receipt of said speech signals transmitted by said one of said first and second telephone station sets by selectively increasing the amplitude level of said attenuated speech signals and then supplying to the other one of said first and second telephone sets via said communication path the resulting speech signals.

2. The method set forth in claim 1 wherein said step of increasing is performed by a telecommunications system operative for establishing said communication path.

3. The method set forth in claim 2 wherein said step of increasing is performed by a toll office within said telecommunications system.

4. The method set forth in claim 3 wherein said step of increasing is performed by echo cancellation circuitry associated with said toll office.

5. The method set forth in claim 1 wherein said predetermined frequency is substantially 300 Hz.

6. The method set forth in claim 1 wherein said predetermined frequency is substantially 400 Hz.

7. The method set forth in claim 1 wherein said frequencies are substantially within a range of 100 Hz to 300 Hz.

8. A method for use in a telecommunications system comprising the steps of
    establishing a telephone connection between at least first and second telephone station sets, wherein at least one of said first and second telephone stations sets is arranged to attenuate speech signals having frequencies within a predetermined range of frequencies, and to then transmit said speech signals over said connection, and
    responding to receipt of said speech signals from said one telephone station set by selectively increasing the amplitude levels of said attenuated speech signals in accordance with a predetermined rate of compensation and by supplying said compensated speech signals to said connection for delivery to the other one of said first and second telephone station sets, in which said step of increasing is disposed at a point along said connection external to said first and second telephone station sets.

9. The method set forth in claim 8 wherein said predetermined range of frequencies is below a frequency of substantially 300 Hz.

10. The method set forth in claim 8 wherein said predetermined range of frequencies is below a frequency of substantially 400 Hz.

11. The method set forth in claim 8 wherein said range of frequencies is substantially between 100 Hz and 300 Hz.

12. The method set forth in claim 8 wherein said point is in a toll office contained in said telecommunications system.

13. The method set forth in claim 12 wherein said point is in echo cancellation circuitry associated with said toll office.

14. A method for use in a telecommunication systems comprising the steps of establishing between at least first and second telephone station sets a connection, wherein each of said first and second telephone station sets is arranged to receive speech signals at an input such that the amplitude levels of those of the received speech signals having frequencies within a predetermined range of frequencies are attenuated by a predetermined rate of loss and to then transmit said received speech signals over said connection, and processing speech signals received from one of said first and second telephone station sets as a function of a predetermined frequency response selected such that, within said predetermined frequency range, the rate of gain relative to the remaining speech passband is substantially opposite to that of said of first and second telephone station sets, and then supplying to the other one of said first and second telephone station sets said processed speech signals.

15. The method set forth in claim 14 wherein said predetermined frequency range is below a frequency of substantially 300 Hz.

16. The method set forth in claim 14 wherein said predetermined frequency range is below a frequency of substantially 400 Hz.

17. The method set forth in claim 14 wherein said step of establishing and said step of for processing are disposed in said telecommunications system.

18. The method set forth in claim 17 wherein said step of processing is disposed in echo cancellation circuitry contained in said telecommunications system.

19. A method for use in a telecommunications system comprising the steps of establishing between first and second telephone station sets a communications path, in which said first and second telephone station sets are arranged to receive at an input terminal speech signals and to decrease by a predetermined rate the amplitude levels of those of said received speech signals having frequencies within a predetermined range of frequencies before transmitting said speech signals over said communications path, and responding to receipt of said speech signals transmitted over said communication path by either one of said first and second telephone station sets by processing said speech signals such that at least the amplitude levels of said speech signals having frequencies within said predetermined range of frequencies are selectively increased in accordance with a predetermined level and by then supplying to the other one of said first and second telephone station sets the processed speech signals.

20. The method set forth in claim 19 wherein said predetermined frequency range is below a frequency of substantially 300 Hz.

21. The method set forth in claim 19 wherein said predetermined frequency range is below a frequency of substantially 400 Hz.

22. The method set forth in claim 21 wherein the step of processing is disposed in a toll office contained in said telecommunications system.

23. The method set forth in claim 22 wherein the step of processing is disposed in echo cancellation circuitry associated with said toll office.

24. A method for use in a telecommunications system comprising the steps of establishing a connection between first and second telephone station sets, in which each of said first and second telephone station sets is arranged to convert speech into audio signals and to then transmit said audio signals over said connection, and responding to receipt from one of said station sets said audio signals by increasing the amplitude of those of said received audio signals in the bass range relative to the remaining range of said received audio signals and then supplying said audio signals to said connection for delivery to the other one of said station sets.

* * * * *

UNITED STATES PATENT AND TRADEMARK OFFICE
CERTIFICATE OF CORRECTION

PATENT NO. : 5,195,132

DATED : March 16, 1993

INVENTOR(S) : Duane O. Bowker, John T. Ganley, J. H. James

It is certified that error appears in the above-identified patent and that said Letters Patent is hereby corrected as shown below:

Col. 6, line 24, after "sets" add --by establishing a communication path between said first and second telephone station sets--.

Signed and Sealed this

Twelfth Day of April, 1994

Attest:

BRUCE LEHMAN

Attesting Officer

Commissioner of Patents and Trademarks

REEXAMINATION CERTIFICATE (2820th)

United States Patent [19]
Bowker et al.

[11] B1 5,195,132
[45] Certificate Issued Mar. 19, 1996

[54] TELEPHONE NETWORK SPEECH SIGNAL ENHANCEMENT

[75] Inventors: Duane O. Bowker, Neptune City; John T. Ganley, Milford; J. H. James, Farmingdale, all of N.J.

[73] Assignee: AT&T Bell Laboratories, Murray Hill, N.J.

Reexamination Request:
No. 90/003,674, Dec. 29, 1994

Reexamination Certificate for:
Patent No.: 5,195,132
Issued: Mar. 16, 1993
Appl. No.: 620,997
Filed: Dec. 3, 1990

Certificate of Correction issued Apr. 12, 1994.

[51] Int. Cl.$^6$ .................................................. H04M 1/76
[52] U.S. Cl. .......................... 379/410; 379/406; 379/400; 379/347; 379/338
[58] Field of Search ...................... 379/400, 401, 379/406, 409, 410, 414, 345, 338, 340, 398, 399, 347

[56] References Cited

U.S. PATENT DOCUMENTS

| | | |
|---|---|---|
| 1,844,424 | 2/1932 | Horton, Jr. . |
| 3,684,838 | 8/1972 | Kahn . |
| 3,696,298 | 10/1972 | Kahn et al. . |
| 3,993,877 | 11/1976 | Sendyk et al. ........................ 379/355 |
| 4,074,087 | 2/1978 | Blake, Jr. et al. ..................... 379/344 |
| 4,217,661 | 8/1980 | Kahn . |
| 4,304,968 | 12/1981 | Klausner et al. ........................ 379/69 |
| 4,457,014 | 6/1984 | Bloy . |
| 4,628,157 | 12/1986 | Chance et al. . |
| 4,652,703 | 3/1987 | Lu et al. . |
| 4,731,834 | 3/1988 | Duttweiler et al. . |
| 4,853,581 | 6/1989 | Cupo et al. . |
| 4,879,746 | 11/1989 | Young et al. . |
| 5,280,525 | 1/1994 | Wesel . |

FOREIGN PATENT DOCUMENTS

57-176895  10/1982  Japan .

OTHER PUBLICATIONS

M Arsac et al., "SICOFI—A Filter for Every SLIC", *Siemens Components*, v23 n1, Feb. 1988, pp. 8–13.
G J Barnes, "Handset Telephone Characteristics in the Telecommunication Network," *1979 National Telecommunications Conference Record*, pp. 51.1.1–51.1.5.
J Bellamy, *Digital Telphony*, Wiley, 1982, pp. 65–71.
R B Blake et al., "Voice Frequency Transmission Treatment for Special Service Telephone Circuits", *Bell Syst. Tech. J.*, vol. 60 No. 7, Sep. 1981, pp. 1585–1619.
H W Bode, "Variable Equalizers", *Bell Syst. Tech. J.*, vol. 17 No. 2, Apr. 1938, pp. 229–244.
R A Bruce et al., "No. 4 ESS—Evolution of a Digital Switching System", *IEEE Trans. Comm.*, vol. COM–27 No. 7, Jul. 1979, pp. 1001–1011.
A H Inglis, "Transmission Features of New Telephone Sets", *Bell Syst. Tech. J., vol. 18 No. 5, Jul. 1938, pp. 359–380.*
IEE Radio Section Discussion, "To What Extent Does Distortion Really Matter in the Transmission of Speech and Music?", *Journal of the IEE*, vol. 95 pt. III No. 38, Nov. 1948, pp. 471–472, continued in Proceedings of the IEE, vol. 96 pt. III No. 41, May 1949, pp. 235–236.

(List continued on next page.)

*Primary Examiner*—James L. Dwyer

[57] ABSTRACT

The quality of voice signals transmitted by a telephone station set, or similar device, are enchanced in accordance with the steps of the instant method before such signals are delivered to a receiving telephone station set by restoring the level of speech energy attenuated by the transmitting set, in which, such restoration is performed at a point along a telephone connection between the transmitting and receiving telephone stations, for example, at a point within a telecommunications system which establishes the connection.

OTHER PUBLICATIONS

Electronic Industries Association Standard EIA–470–A, "Telephone Instruments With Loop Signalling." pp. 8–12 Jul. 1987.

K S Johnson, *Transmission Circuits for Telephonic Communication,* van Nostrand, 1927, pp. 1–5.

W C Jones, "Instruments for the New Telephone Sets", *Bell Syst. Tech. J., vol. 18 No. 5, Jul. 1938, pp. 338–357.*

J Mills, *Signals and Speech in Electrical Communication,* Harcourt Brace Jovanovich 1934, pp. 12–21, 122–135.

J E Needham, "Standardization of Telephone Set Transmission Characteristics," *1979 National Telecommunications Conference Record,* pp. 51.2.1–51.2.6.

E F O'Neill, ed., A History of Engineering and Science in the Bell System: *Transmission Technology (1925–1975),* AT&T Bell Laboratories 1985, pp. 675–685, 688–689, 695–697, 727.

Yamaha Digital Equalizer DEQ–7, advertising brochure.

"R–'i'–P for AT&T Campaign," *Advertising Age,* vol. 65, No. 1, Jan. 3, 1993.

"Long Distance Telcos Reach Out and Touch Everyone—With Ads," *Broadcasting and Cable, vol. 123, No. 3, p. 131, Jan. 17, 1994.*

"Hi–Fidelity is Enlisted in Long–Distance Battle," *The New York Times,* vol. 142, p. D5(L), Jul. 14, 1993.

M. Izsák, ed., *Telecommunication Engineering,* 2nd ed., Budavox Telecommunication Foreign Trading Co. Ltd., 1969, pp. 363–369.

L R Kahn et al., "Enhancement of Telephone Line Performance", *Tech. Papers NAB Engineering Conference,* Mar. 23–26, 1969, pp. 113–116.

L Lerach et al., "Digital Duo Boosts Flexibility and Function of Telephone Lines", *Electronic Design,* Jan. 23, 1986, pp. 115–120.

K B Miller, *Telephone Theory and Practice,* McGraw–Hill 1930, pp. 183–185, 239–250.

W Neu et al., "Project for a Digital Telephone Network", *IEEE Trans. Comm. Tech.,* vol. COM–16 No. 5, Oct. 1968, pp. 633–646.

P W Blye et al., "A Revised Telephone Transmission Rating Plan", *Bell Syst. Tech. J.,* vol. 34 No. 3, May 1955.

D O Bowker et al., "Speech Transmission Quality of Wideband Packet Technology," *IEEE/IEICE Global Telecommunication Conference 1987,* vol. 3, pp. 47.7.1–47.7.3.

S P Chakravarti "On Negative Resistance Equalizers for Telephone Transmission Systems", *The London, Edinburgh, and Dublin Philosophical Magazine and Journal of Science,* vol. 23, Jan.–Jun. 1937, pp. 897–919.

E H Colpitts "Scientific Research Applied to the Telephone Transmitter and Receiver", *Bell Syst. Tech. J.,* vol. 16 No. 3, Jul. 1937, pp. 251–274.

D L Duttweiler, "Bell's Echo–Killer Chip," *IEEE Spectrum,* Oct. 1980, pp. 34–37.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2 and 17 are cancelled.

Claims 1, 3, 8, 12, 14, 18, 19, 22 and 24 are determined to be patentable as amended.

Claims 4-7, 9-11, 13, 15, 16, 20, 21 and 23, dependent on an amended claim, are determined to be patentable.

New claims 25-32 are added and determined to be patentable.

1. A method of enhancing the quality of speech signals exchanged between first and second telephone station sets, said method comprising the steps of responding to receipt of a request originated by either one of said first or second telephone station sets by establishing a communication path between said first and second telephone station sets, wherein at least one of said first and second telephone station sets is arranged to attenuate by a predetermined attenuation rate those of said speech signals having frequencies below a predetermined frequency and to transmit said speech signals over said [communications] *communication* path, and responding to receipt of said speech signals transmitted by said one of said first and second telephone station sets by selectively increasing the amplitude level of said attenuated speech signals and then supplying to the other one of said first and second telephone sets via said communication path the resulting speech signals, *said step of increasing being carried out in said communication path between telephone switch circuitry at which said speech signals are received from said one of said first and second telephone station sets and telephone switch circuitry from which said resulting speech signals are supplied to said other of said first and second telephone station sets.*

3. [The method set forth in claim 2] *A method of enhancing, within a telecommunications system, the quality of speech signals exchanged between first and second telephone station sets, said method comprising the steps of*

*responding to receipt of a request originated by either one of said first and second telephone station sets by establishing a communication path between said first and second telephone station sets, wherein at least one of said first and second telephone station sets is arranged to attenuate by a predetermined attenuation rate those of said speech signals having frequencies below a predetermined frequency and to transmit said speech signals over said communication path, and*

*responding to receipt of said speech signals transmitted by said one of said first and second telephone station sets by selectively increasing the amplitude level of said* attenuated speech signals and then supplying to the other one of said first and second telephone sets via said communication path the resulting speech signals, wherein said step of increasing is performed by a toll office within said telecommunications system.

8. A method for use in a telecommunications system comprising the steps of establishing a telephone connection between at least first and second telephone station sets, wherein at least one of said first and second telephone [stations] *station* sets is arranged to attenuate speech signals having frequencies with a predetermined range of frequencies, and to then transmit said speech signals over said connection, and responding to receipt of said speech signals from said one telephone station set by selectively increasing the amplitude levels of said attenuated speech signals in accordance with a predetermined rate of compensation and by supplying said compensated speech signals to said connection for delivery to the other one of said first and second telephone station sets, in which said step of increasing is disposed at a point along said connection *which is* external to said first and second telephone station sets *exclusive of any two-wire telephone lines directly connected to said first and second telephone station sets.*

12. [The method set forth in claim 8] *A method for use in a telecommunications system comprising the steps of*

*establishing a telephone connection between at least first and second telephone station sets, wherein at least one of said first and second telephone stations sets is arranged to attenuate speech signals having frequencies within a predetermined range of frequencies, and to then transmit said speech signals over said connection, and*

*responding to receipt of said speech signals from said one telephone station set by selectively increasing the amplitude levels of said attenuated speech signals in accordance with a predetermined rate of compensation and by supplying said compensated speech signals to said connection for delivery to the other one of said first and second telephone station sets, in which said step of increasing is disposed at a point along said connection external to said first and second telephone station sets,* wherein said point is in a toll office contained in said telecommunications system.

14. A method for use in a telecommunications system comprising the steps of establishing between at least first and second telephone station sets a connection, wherein each of said first and second telephone station sets is arranged to receive speech signals at an input *and to process said speech signals* such that the amplitude levels of those of the received speech signals having frequencies within a predetermined range of frequencies are attenuated by a predetermined rate of loss and to then transmit said received speech signals over said connection, and processing speech signals received from one of said first and second telephone station sets as a function of a predetermined frequency response selected such that, within said predetermined frequency range, the rate of gain relative to the remaining speech passband is substantially opposite to that of said *one* of first and second telephone station sets, and then supplying to the other one of said first and second telephone station sets said processed speech signals, *said processing being carried out within a telephone switching office.*

18. The method set forth in claim [17] *8* wherein said step of [processing] *increasing* is disposed in echo cancellation circuitry contained in said telecommunications system.

19. A method for use in a telecommunications system comprising the steps of establishing between first and second telephone station sets a communications path, in which said first and second telephone station sets are arranged to receive at an input terminal speech signals and to decrease by a predetermined rate the amplitude levels of those of said received speech signals having frequencies within a predetermined range of frequencies before transmitting said speech signals over said communications path, and responding to receipt of said speech signals transmitted over said [communication] *communications* path by either one of said first and second telephone station sets by processing said speech signals such that at least the amplitude levels of said speech signals having frequencies within said predetermined range of frequencies are selectively increased in accordance with a predetermined level and by then supplying to the other one of said first and second telephone station sets the processed speech signals, *said processing step being carried out in said communications path between first and second telephone switching office means.*

22. [The method set forth in claim 21] *A method for use in a telecommunications system comprising the steps of*

*establishing between first and second telephone station sets a communications path, in which said first and second telephone station sets are arranged to receive at an input terminal speech signals and to decrease by a predetermined rate the amplitude levels of those of said received speech signals having frequencies within a predetermined range of frequencies before transmitting said speech signals over said communciations path, and*

*responding to receipt of said speech signals transmitted over said communications path by either one of said first and second telephone station sets by processing said speech signals such that at least the amplitude levels of said speech signals having frequencies within said predetermined range of frequencies are selectively increased in accordance with a predetermined level and by then supplying to the other one of said first and second telephone station sets the processed speech signals,* wherein the step of processing is disposed in a toll office contained in said telecommunications system.

24. A method for use in a telecommunications system comprising the steps of establishing a connection between first and second telephone station sets, in which each of said first and second telephone station sets is arranged to convert speech into audio signals and to then transmit said audio signals over said connection, and responding to receipt from one of said station sets said audio signals by increasing the amplitude of those of said received audio signals in the bass range relative to the remaining range of said received audio signals and then supplying said audio signals to said connection for delivery to the other one of said station sets, *said step of increasing being carried out at a point within said connection which is other than within a two-wire telephone line directly connected to either of said first and second telephone sets.*

25. The method of claim 1 wherein said step of increasing is carried out at a rate which is substantially equal and opposite to said predetermined attenuation rate.

26. The method of claim 25 wherein said predetermined attenuation rate is an attenuation rate below 300 Hz for telephone station sets that is set forth in the January, 1981 RS-470 EIA standard.

27. The method of claim 8 wherein said predetermined rate of compensation is such as to offset the effect of the speech signal attenuation that said one of said first and second telephone sets is arranged to provide.

28. The method of claim 27 wherein said one of said first and second telephone sets is arranged to provide attenuation as set forth in the January, 1981 RS-470 EIA standard.

29. The method of claim 14 wherein said predetermined rate of loss is that specified in the January, 1981 RS-470 EIA standard for telephone station sets for frequencies below 300 Hz.

30. The method of claim 19 wherein in said processing step, said speech signals having frequencies within said predetermined range of frequencies are increased at a rate which offsets the predetermined rate by which they are decreased in said first and second telephone station sets.

31. The method of claim 30 wherein the predetermined rate by which said received speech signals are decreased in said first and second telephone station sets is the rate specified in the January, 1981 RS-470 EIA standard for telephone station sets for frequencies below 300 Hz.

32. The method of claim 24 wherein in said increasing step, said amplitude of said received audio signals in the bass range is increased to an extent which offsets bass range attenuation specified for telephone station sets in the January, 1981 RS-470 EIA standard.

\* \* \* \* \*